United States Patent [19]

Hutter, III et al.

[11] 4,071,338

[45] Jan. 31, 1978

[54] AIR EXHAUSTED MIXING BOWL

[75] Inventors: Charles G. Hutter, III, Hollywood, Calif.; Peter S. Hutter, Aspen, Colo.

[73] Assignee: Physical Systems, Inc., North Hollywood, Calif.

[21] Appl. No.: 652,773

[22] Filed: Jan. 27, 1976

[51] Int. Cl.$^2$ .......... B01D 50/00

[52] U.S. Cl. .......... 55/385 C; 55/316; 55/387; 55/467; 98/115 R; 128/188; 141/93

[58] Field of Search .......... 55/316, 318, 383, 384, 55/385 R, 385 C, 387, 419, 467, 476, 485, 486, 507, 509, 512; 98/1 R, 115 R; 259/37; 141/93; 128/188

[56] References Cited

U.S. PATENT DOCUMENTS

| | | | |
|---|---|---|---|
| 1,896,951 | 2/1933 | Hahn | 98/115 R |
| 2,071,881 | 2/1937 | Krause et al. | 55/509 X |

FOREIGN PATENT DOCUMENTS

| | | | |
|---|---|---|---|
| 100,342 | 3/1937 | Australia | 55/385 R |
| 890,320 | 2/1944 | France | 98/115 R |
| 415,547 | 7/1924 | Germany | 55/387 |
| 1,191,338 | 4/1965 | Germany | 55/385 R |

*Primary Examiner*—Frank W. Lutter
*Assistant Examiner*—Kathleen J. Prunner
*Attorney, Agent, or Firm*—Fulwider, Patton, Rieber, Lee & Utecht

[57] ABSTRACT

Means for exhausting the fumes arising from material being mixed in a mixing bowl, the fumes being drawn off and passed through a filter that removes the noxious materials and returns the air to the room in which the bowl is located. The device is particularly adapted for use in surgical operating rooms where the utmost precautions must be taken to prevent the inhalation of any fumes by the patient and where sterility must be maintained at all times during the operation.

7 Claims, 6 Drawing Figures

AIR EXHAUSTED MIXING BOWL

BACKGROUND OF THE INVENTION

In the formulation of modern cements, adhesives and coatings, it is frequently necessary to mix two or more components immediately before use. Often, one or more of the materials gives off toxic fumes, and hence, many of the products are specifically intended to be used only in well ventilated areas. It is sometimes impossible or impractical to do the mixing in such an area and problems consequently arise under these conditions. By way of example, in orthopedic surgery where a portion of a bone is replaced as in the replacement of the hip joint, the replacement part or prosthesis is cemented to the natural bone. As mentioned, the cement must be mixed just before use and since it is to be placed within the human body, it must be formed of sterile materials that are maintained in this condition of sterility at all times. This means that the sterile materials must be removed from their packaging and mixed together within the sterile confines of the operating room, since mixing elsewhere would destroy their sterility.

Since one of the components of the commonly used cement is a volatile liquid that is quite toxic, it is important that the fumes from the liquid be removed from the operating room. In the past, this has sometimes been done by performing the mixing in a fume hood that must be built into the operating room and provided with a discharge vent that opens into the outer atmosphere. Such a solution is obviously an expensive and generally impractical one.

These problems are overcome by the present invention which provides a mixing bowl and a holder therefor in which the fumes from the mixing bowl, together with a certain amount of air are drawn off and passed through a filter that absorbs the fumes, and the cleaned air is then returned to the operating room still in sterile condition. A self-contained pump and power supply is provided to exhaust the fumes and the entire apparatus can be sterilized as needed and the sterility maintained with minimum effort.

SUMMARY OF THE INVENTION

The present invention provides apparatus for withdrawing fumes arising from a bowl or similar container, the apparatus including a holder surrounding the container and having an annular chamber into which the fumes are first drawn and then transferred to an annular plenum from which the fumes are drawn into a filter compartment containing charcoal or other suitable filter through which the air is drawn by means of a suitable pump.

DESCRIPTION OF PREFERRED FORM

Figure 1:
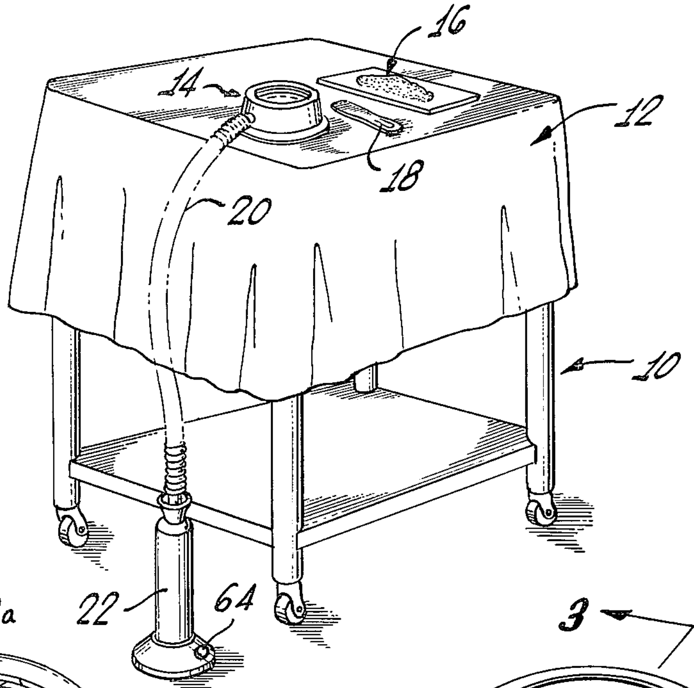
FIG. 1 is a perspective view showing the improved air exhausted mixing bowl as it would be used in an operating room, showing its location on a table with the exhaust pump located on the floor.

In FIG. 1, the general conditions under which the mixing bowl will be used are indicated. In an operating room where the cement will be used, there is provided a table 10 that has been suitably sterilized and which is provided with a sterile drape 12 covering the surface of the table and hanging down on each side. A mixing bowl assembly 14 is provided on the upper surface of the drape 12 and the components 16 of the cement are located conveniently nearby. A spoon or spatula 18 for mixing the cement is also provided. From the mixing bowl assembly 14 a flexible tube 20 extends downwardly to a self-contained pump 22.

Figure 2:
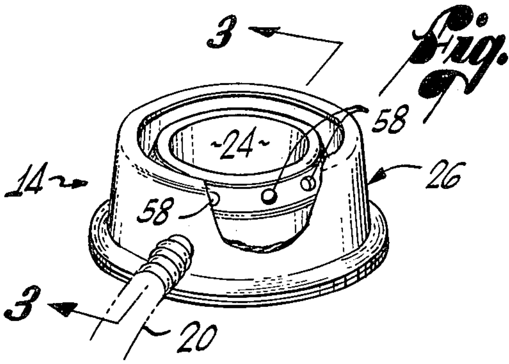
FIG. 2 is a close-up perspective view of the mixing bowl assembly.

As better seen in FIG. 2 the bowl assembly 14 comprises a removable mixing bowl 24 and a bowl holder 26. Generally, the bowl 24 and the holder 26 will be used during the course of one surgical operation and will thereafter be discarded. In fact, it is contemplated that in those instances where two or more batches of cement must be mixed for a single surgery, it is anticipated that the bowl 24 will be discarded after each batch has been used. It thus becomes important to keep the cost of the bowl 24 and the holder 26 to a minimum. For this reason, it is anticipated that both the bowl 24 and the major portions of the bowl holder 26 will be formed of a suitable plastic.

Figure 3:
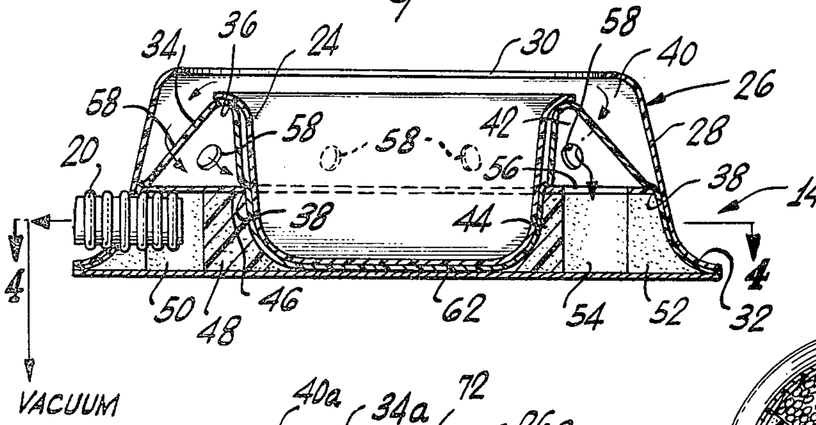
FIG. 3 is a vertical cross-sectional view taken along the line 3—3 of FIG. 2, showing the construction of the bowl assembly.

As seen in FIGS. 2 and 3, the bowl holder 26 includes a generally cylindrical or frusto-conical shell or housing 28 having an inturned lip at its upper end that leaves a central opening 30 of a size slightly larger than the maximum diameter of the bowl 24. At the bottom, the housing 28 is preferably spread outwardly a slight amount to form a lip 32 providing a flat lower surface at the extreme outer periphery.

Within the housing 28 is a filter holder 34 having a lower section whose outer periphery is shaped and sized to fit snugly within the corresponding portion of the housing 28. This snug fitting portion, which may be referred to as the filter portion, merges into a plenum portion located above the filter portion. At its uppermost end, the plenum portion turns inwardly and then downwardly forming a lip 36 on which the lip of the mixing bowl 24 rests. In its central portion, the filter holder 34 extends generally downwardly to a point substantially aligned with the lower surface of the lip 32, thus forming a central well into which the bowl 24 fits.

Approximately midway between the lower surface of the filter holder 34 and the lip 36 at the point dividing the filter chamber from the plenum, there is formed a shoulder 38 on both the inner and outer walls of the filter holder 34. Above the shoulder 38, the outer wall of the filter holder 34 is sloped inwardly towards the lip 36 to provide an annular chamber 40 bounded by the wall of the housing 28, and the outer wall of the filter holder 34. The lip at the upper end of the housing 28 partially closes the upper portion of the chamber 40 and the space between the lip of the mixing bowl 24 and the upper lip of the housing 28 provides a space through which air and fumes may be drawn into the chamber 40.

To separate the plenum section 42 from the filter section 44, an annular sheet 46 is placed in the filter holder 34 to rest against the shoulders 38 to which it is preferably sealed. As best seen in FIG. 3, the flexible hose 20 is inserted through the outer wall of the housing 28 into the filter section 44 beneath the annular sheet 46. A block 48 of an open cell foam is inserted between the inner and outer walls of the filter chamber 44, the block having a chamber 50 therein into which the end of the flexible hose 20 projects. A similar block 52 of open cell foam is mounted in the filter chamber 44 substantially diametrically opposite the block 48 and this block 52 is likewise provided with a central chamber 54.

Aligned with the chamber 54 is an aperture 56 in the annular sheet 46 so that fluid communication is established between the filter chamber 44 and the plenum 42. Apertures 58 are formed in the outer upper wall of the filter holder 34 so that communication is likewise established between the plenum 42 and the chamber 40.

In the space within the filter chamber 44 between the foam blocks 48 and 52, granular charcoal 60 or other suitable filter material is provided to absorb the fumes that are to be removed. The entire device is closed by means of a plate 62 that is placed across the bottom of the filter compartment 44 and preferably is cemented to the lower lip of the filter holder 34 and to the bottom of the central recess thereof.

It will be appreciated that it is important that the fumes be drawn substantially uniformly into the chamber 40. For this reason, the holes 58 connecting the plenum 42 to the chamber 40 are suitably spaced so that the resulting air flow is as desired. Thus, it is generally preferable not to locate an aperture 58 immediately above the chamber 54, and it may be desirable to provide more apertures at the points more distant from the chamber 54.

To complete the system for a surgical operating room, the pump 22 is provided. To prevent the need for cables across the operating room floor, the pump 22 is preferably driven by batteries, preferably rechargeable, that are connected through a foot switch 64 to motor means that in turn drive a fan or blower so connected that air is drawn in through the flexible hose 20 and discharged out along the floor.

ALTERNATE FORMS OF CONSTRUCTION

Figure 5:
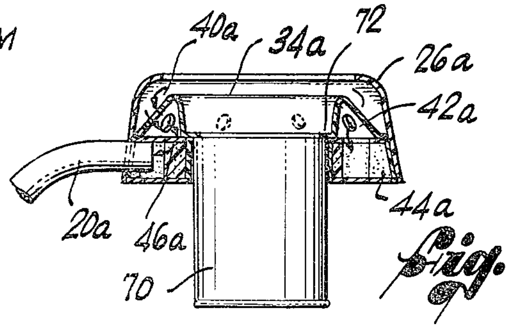
FIG. 5 is a sectional view similar to FIG. 3 showing the modification of the invention as it is adapted to fit over a larger container such as a paint can, as hereinafter described.
Figure 4:
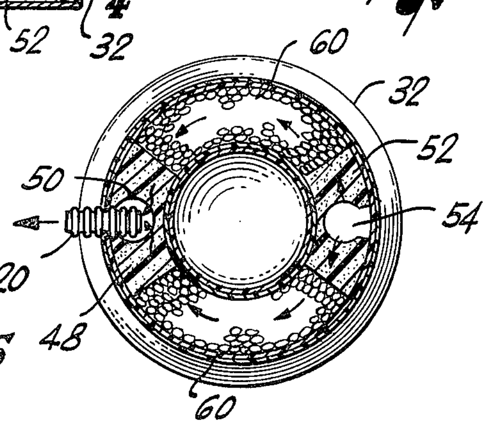
FIG. 4 is a sectional plan view of the bowl assembly taken along the line 4—4 of FIG. 3.

The broad concept of the present invention is not limited to use in the mixing of cement in surgical operating rooms, but instead has wider application. As previously mentioned, many two-component cements, adhesives and coatings make use of materials that give off toxic fumes. The present invention may easily be adapted for the mixing of such compounds to the benefit of those who must mix them. As shown in FIG. 5, the air exhaust means may be modified to fit over and rest upon a canister 70 in which the material is to be mixed. While the size of the components may be larger, their basic construction and function is the same as that previously described. Thus, the housing 26*a* is adapted to receive a filter holder 34*a* having a plenum section 42*a* and a filter section 44*a*. An annular sheet 46*a* separates the plenum portion 42*a* from the filter portion 44*a* while a pump (not shown) connected to hose 20*a* provides a suction to draw the fumes and air from above the canister 70 into the chamber 40*a* and into the plenum 42*a*, through the filter section 44*a*, and out the hose 20*a*. The central portion of the filter holder 34*a* is open to receive the upper portion of the canister 70, and an inwardly extending lip 72 is adapted to rest upon the upper edge of the canister to support the device in proper location on the canister.

It will be appreciated that the device need not be constructed in the precise form shown. Thus, the apertures 58 between the plenum chamber 42 and the chamber 40 may be made of different sizes so that the flow of air is properly apportioned.

Figure 6:
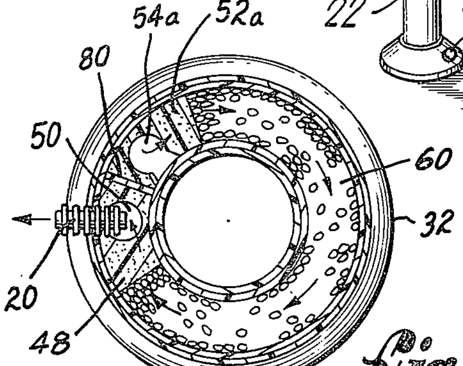
FIG. 6 is a sectional view similar to FIG. 4 of another alternate form.

In another optional form, the aperture 56 between the filter compartment 44 and the plenum 42 may be located at a point adjacent but not aligned with the chamber 50. As shown in FIG. 6, a chamber 54*a* is located adjacent the chamber 50 and separated therefrom by suitable means such as a partition 80, and chamber 54*a* is provided with a block 52*a* of suitable open cell foam, similar to block 52 of the preferred form. The aperture 56 is aligned with the chamber 54*a*; and foam block 52 and chamber 54 are omitted and replaced with the filter material 60 so that a single continuous path through the filter material, longer than that in the preferred form shown in FIGS. 1–4, is provided in the alternate form shown in FIG. 6.

While a preferred and alternate form of construction have been shown and described, it will be appreciated that the invention is not to be limited to the particular form or arrangement of parts herein described and shown, except as limited by the following claims.

We claim:

1. Air exhausting means for a container which includes:

a housing adapted to surround the upper edge of said container, the upper edge of said housing being above the upper edge of said container;

a filter holder within said housing and adapted to surround said container, said filter holder having an annular shape and being spaced from said housing to form an annular chamber surrounding the upper edge of said container;

divider means within said filter holder dividing it into an upper plenum and a lower filter chamber, said filter holder having a first passageway establishing fluid connection between said annular chamber and said plenum, and said divider means having a second passageway therethrough establishing fluid connection between said plenum and said filter chamber;

outlet means in said filter chamber and passing out said housing adapted to be connected to exhaust means; and absorption filter means in said filter chamber between said second passageway and said outlet means, whereby air and fumes from said container may be drawn from the space above said container and passed from said annular chamber into said plenum and into said filter chamber, through said filter means for absorption of said fumes and out said outlet means.

2. Air exhaust means as defined in claim 1 in which said outlet means is substantially diametrically opposite said second passageway, whereby there are two paths between said second passageway and said outlet means, through said filter means.

3. Air exhaust means as defined in claim 1 in which said outlet means is adjacent said second passageway, but separated therefrom whereby the only path from said second passageway to said outlet is a circular path through substantially all of said filter means.

4. Air exhaust means as defined in claim 1 in which said housing has its upper edge turned in to form a lip above and surrounding the upper edge of said container.

5. Air exhaust means as defined in claim 4 in which said lip defines an opening slightly larger than said container, and the upper edge of said container rests upon the upper edge of said filter holder.

6. Air exhaust means as defined in claim 4 in which said housing has a central opening in its bottom of a size to receive said container, and said filter holder has an inwardly projecting stop means adapted to bear against the upper edge of said container, whereby said housing may be placed upon said container and supported thereby.

7. Air exhausting means for a container which includes:

a housing adapted to surround the upper edge of said container, the upper edge of said housing being above the upper edge of said container;

a filter holder within said housing and adapted to surround said container, said filter holder having an annular shape and being spaced from said housing to form an annular chamber surrounding the upper edge of said container;

divider means within said filter holder dividing it into an upper plenum and a lower filter chamber adapted to receive a filter means, said filter holder having a first passageway establishing fluid connection between said annular chamber and said plenum, and said divider means having a second passageway therethrough establishing fluid connection between said plenum and said filter chamber; and outlet means in said filter chamber adapted to be connected to exhaust means, whereby air and fumes from said container may be drawn from the space above said container and passed from said annular chamber into said plenum and into said filter chamber, and out said outlet means.

* * * * *